United States Patent Office
2,847,433
Patented Aug. 12, 1958

2,847,433

SEPARATION OF SATURATED AND UNSATURATED FATTY ACIDS

John L. Ohlson, Chicago, and Charles S. Steiner, Homewood, Ill., assignors to Swift & Company, Chicago, Ill., a corporation of Illinois No Drawing. Application February 1, 1956
Serial No. 562,656

5 Claims. (Cl. 260—406)

The present invention in general relates to the manufacture of fatty acids and has to do particularly with the separation of saturated fatty acids from unsaturated fatty acids.

It has been the recent practice in industry to prepare fatty acids by the continuous splitting of fats whereby the fat is treated with water in a countercurrent tower under high pressure and temperature conditions. The fatty acids so produced are mixtures of unsaturated and saturated fatty acids and these are further separated by crystallization techniques. The saturated acids, being in general the higher melting and least soluble acids, can be crystallized and separated from the unsaturated acids. Stearic acid thus separated usually has associated with it a certain amount of unsaturated acids, the higher the proportion of unsaturated acids present in the saturated acids, the lower the quality of the saturated acids. Other factors being equal, triple-pressed grade stearic acid which contains a minimum of unsaturated material is considered to be top quality stearic acid, and double-pressed grade stearic acid, which contains a medium amount of unsaturated acids, is considered to be more desirable than single-pressed grade stearic acid, which contains a greater amount of unsaturated acids and is considered to be the least desirable of the above three commercial grades of stearic acid. Purity of the saturated fatty acid fraction is important for another reason—the color stability of the saturated acids is also effected by the amount of double bond present as unsaturated fatty material, and as the amount of unsaturation is decreased, the color stability of the saturated acid fraction is increased.

Those skilled in the art will recognize that the term "stearic acid" is used in the fats and oils art to mean a mixture of saturated fatty acids, usually myristic, palmitic, and stearic acids, the latter two usually comprising the predominant portion. This usage has been employed in the instant description. For example, "stearic acid" produced from a typical tallow or grease would contain the following approximate proportions of saturated fatty acids:

|  | Tallow | Grease |
|---|---|---|
|  | Percent | Percent |
| Myristic | 6.3 | 3.2 |
| Palmitic | 55.6 | 69.3 |
| Stearic | 38.1 | 27.5 |

In general, the present invention relates to the separation of a mixture of saturated and unsaturated fatty acids obtained by the splitting of fats and oils into a saturated acid fraction and a highly oxygenated acid fraction by treating the mixed acids with an oxidizing agent without rupturing the fatty chain and then separating the fractions by use of a solvent. The unsaturated fatty acids may be epoxidized or hydroxylated depending on the conditions of the reaction. The oxidized fatty materials are then separated from the saturated fatty acids by subjecting the acids to conditions so that the components separate into two different phases. The last step may be accomplished by fractional crystallization of one of the components, by solvent fractionation or solvent crystallization, or a combination of the two procedures. In the preparation of the fatty acids of the instant process, triglyceride fat is hydrolyzed to produce glycerine and free fatty acids. Any conventional method such as the Twitchell process or a high pressure catalytic splitting may be employed to split the fatty glycerides. The split fatty acids, a mixture of saturated and unsaturated acids, are pumped to a reaction chamber wherein the unsaturated acids are oxidized without rupturing the fatty chain.

In the customary method of countercurrent splitting to obtain fatty acids, the triglycerides are introduced into the lower portion of a vertical tower and water is introduced into the upper portion of the same tower so that the fat and water pass countercurrently under temperature and pressure conditions such that the fat is hydrolyzed into fatty acids and glycerine. A portion of the water at the operating condition dissolves in the fat to provide water for the hydrolysis. An excess of undissolved water is used and such excess water washes the glycerine from the fat so that the glycerine is removed from the zone of reaction and promotes the hydrolysis reaction. The resulting fatty acids are withdrawn from the top of the tower and the glycerine fraction or sweet water is withdrawn from the bottom of the tower. The temperature and pressure conditions used in such a process are ordinarily about 350° F.–600° F. and pressure is sufficiently high to maintain the water in the liquid phase. Such a process is more fully described in United States Patent Re. No. 22,006, issued January 13, 1942, to Ittner et al., and United States Patent No. 2,156,863, issued May 2, 1939, to Mills et al.

Another process for hydrolysis of triglycerides, perhaps less commonly used today, is the Twitchell process. This process is a catalytic hydrolysis of triglycerides by boiling at atmospheric pressure and is more particularly described on pages 668–670, Oil and Fat Products, by Alton E. Bailey (1945).

Hydroxylation of the unsaturated fatty acids may be accomplished by reacting the unsaturated fatty acids with any of the known hydroxylating agents. Thus, hydroxylation may be accomplished by treating the unsaturated fatty acids with hydrogen peroxide in the presence of formic acid, said formic acid being used at a ratio of at least 2.4 mols of formic acid per mol of double bond in the fatty acid. Larger amounts of formic acid may be used, if desired. The reaction yields mixed di-hydroxy or polyhydroxy fatty acids as well as formoxy, hydroxy fatty acids, and the latter is hydrolyzed to form di-hydroxy acids.

Alternatively, any of the conventional oxidizing agents, such as nitric acid, chromic acid, potassium permanganate and various per acids such as peracetic, perbenzoic and monoperphthalic acid in aqueous solution and under mild oxidizing conditions which will successfully hydroxylate unsaturated acids, may be used in the instant process. It will be recognized that such agents as nitric acid, chromic acid, and potassium permanganate which are capable of splitting the double bond to give scission products must be used under mild enough conditions so that only hydroxylation takes place.

Epoxidation of the unsaturated fatty acids may be accomplished in one of several ways. Classically, the mixture of saturated and unsaturated fatty acids may be treated with perbenzoic or monoperphthalic acid usually in a solvent with a slight molar excess of the oxidizing agent and at low reaction temperatures to yield the epoxidized derivatives of the unsaturated acids. More practically, peracetic acid may be used as disclosed in United States Patent No. 2,458,484, issued on January 4, 1949, to Terry and Wheeler, and United States Patent No. 2,567,930, issued on September 18, 1951, to Findley and Swern. The peracetic acid may be preformed peracetic acid or it may be formed in situ from acetic acid and hydrogen peroxide in the presence of sulfuric acid catalyst. Alternatively, the epoxidation may be effected by a low temperature reaction of the unsaturated fatty acids with hydrogen peroxide using formic acid as the catalyst. In this instance, less than one mol of formic acid is used per mol of the double bond in the mixed unsaturated-saturated acids. Naturally, it would be desirable to carry out the epoxidation reaction until the iodine number of the product is less than one, but practically this is highly improbable. For practical purposes in our process, however, the allowable maximum iodine value of the resultant product will be determined to a great extent by the amount of polyunsaturated fatty acids present in the mixture. Thus, if only one of the double bonds of linoleic acid is epoxidized, this is sufficient to change the solubility characteristics of the final product enough so that it can readily be separated from the saturated acids. Thus, it is seen that only one double bond in linoleic acid need be oxidized in order to allow this invention to proceed successfully. For most tallows and greases, the practical iodine value of 2 to 5 of the resulting product will produce a satisfactory operation of the process.

The choice of whether to hydroxylate or epoxidize the unsaturated acids depends to a large extent on the market demand for this oxidized product. Both the di-hydroxy acids and the epoxy acids may be effectively separated from the saturated acids by this process.

A number of methods are available which may be used to separate the epoxidized or hydroxylated fatty acids from the saturated acids. In each method the difference in solubility of the saturated an epoxidized or hydroxylated fatty acids is utilized to separate the components. In a specific case, a suitable solvent may be employed whereby the density of the mixture is lowered and the mixture is caused to separate into two liquid phases of different specific gravities.

*Example I*

As an example of the operation of the invention, a sample of tallow fatty acids was obtained. These tallow fatty acids had been prepared by splitting tallow by contacting it with water in a fat splitter by the usual high temperature-high pressure procedure and had been subsequently treated by solvent extraction in liquid propane at about 210–212° F. at 680 p. s. i. g. to decolorize the resulting tallow fatty acids by removal of color bodies, polymerized and oxidized fatty material.

To 150 grams af these tallow acids in a 3 neck flask fitted with a stirrer and condenser and placed in a cooling bath is added 34 grams of 50% hydrogen peroxide. This represents an excess of hydrogen peroxide over the amount necessary to hydroxylate all of the double bonds present in the unsaturated acids. Eighty grams of 90% formic acid containing 0.5 gram of concentrated sulfuric acid is then added slowly so that the reaction does not become violently exothermic, and when all of the formic acid is added, it is held at 50° C. for at least 6 hours. At the end of the reaction period, cold water is added to the reaction mixture and the fatty phase is washed successively with two or three portions of cold water. Because a small amount of formoxy ester is formed during this hydroxylation reaction, the reaction product is taken up in an excess of 3 normal sodium hydroxide and boiled for one hour to hydrolyze the ester linkages. This product is then poured into 6 normal hydrochloric acid in excess in order to separate the free acids. The free acids are then washed free of mineral acid with hot water and are now ready for solvent separation.

The product of the reaction is mixed with one liter of hexane, warmed and filtered. The filtrate is evaporated on the steam bath to remove the hexane and the solid that has been filtered out is dried at room temperature. Substantially all of the stearic acid calculated to be in the tallow fatty acids originally is recovered from the hexane filtrate and the solid material which has been filtered out of the hexane solution consists almost entirely of di-hydroxy stearic acid with a small amount of other hydroxylated fatty acids.

*Example II*

Double pressed stearic acid weighing 14.2 grams is mixed in 19 ml. of 33% potassium hydroxide and then three liters of water is added. The solution is cooled to 0° C., and one liter of 0.1% potassium permanganate solution at 0° C. added in about 25 minutes with constant stirring. The temperature is held to below 5° C. by the addition of ice when necessary. When the reaction is substantially complete, the reaction mixture is heated and sulphur dioxide added until the manganese dioxide dissolves, and then sulfuric acid is added to make acid. The solid which separated is filtered off and dried.

This solid is then mixed with one liter of low boiling petroleum ether to dissolve the saturated acids. After filtering, the solvent is distilled off. A practically quantitative separation of the hydroxylated acids from the saturated acids is obtained.

Because the mixture of di-hydroxy compounds and saturated acids prepared by permanganate oxidation exhibit the same solubility characteristic in hydrocarbon solvents as the hydroxylated mixture prepared by peracid oxidation, this procedure can be substituted in the foregoing process to hydroxylate the acids.

In the broader aspects of the invention, it is intended that the process of the present invention may be operated with a non-polar solvent which may be partially or completely miscible with the fatty material. One process which is particularly applicable is the contacting of the mixture of fatty acids and hydroxylated fatty acids with a low boiling solvent at temperatures in the temperature range near the critical temperature of the solvent in which the solubility of the saturated fatty acids in the solvent decreases with rising temperature. The temperature range lies above the temperature of maximum solubility which is ordinarily not more than about 100° F. below the critical temperature of the solvent and extends to a few degrees above the critical temperature of the solvent. Any fluid may be employed which is partially miscible with the fatty acids to be treated and does not react chemically with the mixture. Solvents such as low boiling hydrocarbons, i. e., methane, ethane, propane, butane, and so on and corresponding olefins as well as mixtures thereof, halogenated hydrocarbons including dichlorodifluoro methane and methyl fluoride, alcohols, dimethyl ether, and methyl ethyl ether may be used. Propane is ordinarily preferred in carrying out this process because of its relatively low cost and inertness and because it exhibits the solubility characteristics required of a solvent for this process. In the normal operation of a fractionating system using propane, the propane is introduced into the bottom of a tower and the fatty acid mixture is introduced at some point midway up the tower. The operating conditions imposed on the tower are such that at equilibrium the saturated fatty acids are soluble in the liquid propane and the hydroxy or epoxy acids are insoluble. As a result of the differences in gravity, the undissolved hydroxy or epoxy acid phase flows downwardly in countercurrent contact with the up flowing solvent phase. The solvent phase contains the dissolved saturated fatty acid and is removed from the overhead at the top of the tower. The heavier insoluble hydroxylate or epoxide phase is removed as the bottoms fraction. The volumetric ratio of solvent and fatty acid mixture introduced into the tower should not be lower than about 5 to 1 and preferably should be at least 12 to 1 to 25 to 1 or higher. Since the operation is essentially a contact of the liquid solvent phase with a liquid fatty acid phase the maximum temperature in the tower is usually lower than the critical temperature of the solvent, but may not necessarily be so as long as sufficient pressure is maintained to maintain a substantially entirely liquid condition. When using propane as the solvent, a maximum operating pressure of 500 to 750 p. s. i. g. is satisfactory. The acid fraction separated by this continuous process can be recovered by evaporation of the solvent of the overhead fraction or by crystallization of the saturated acid from the overhead fraction, by cooling and by flashing off under atmospheric or reduced pressure the solvents removed from the bottoms fraction. By varying conditions of ratio of solvent to feed, pressure and temperature, a wide degree of fractionation is possible. By raising the temperature or decreasing the pressure in the fractionating column, one may increase the amount of saturated acid coming off as bottoms with the oxidized acids and hence improve the purity of the hy-saturated acids coming off as overhead. Conversely, a decrease in temperature or an increase in pressure decreases the amount of saturated acid coming off as bottoms.

In a preferred embodiment of our process, the temperature of the propane fractionating column is held between about 190–220° F. and the pressure is maintained between about 670 and 720 p. s. i. g. Under these conditions, the saturated acid overhead comes off substantially colorless because, in addition to the oxidized acids, the color bodies drop through the column and are removed as bottoms.

Our invention may be further understood from the following examples:

*Example III*

A commercial mixture of tallow fatty acids is hydroxylated according to the procedure given in the previous example. In a continuous system, 250 parts of propane are mixed with 10 parts of the hydroxylated mixed tallow fatty acids and kept at 210 to 212° F. at 700 p. s. i. g. The overhead fraction after removal of the propane consists of about 92% of the saturated acids present in the original tallow fatty acid mixture while all of the hydroxylated material plus about 8 percent of the saturated acids is recovered in the bottoms fraction.

In another embodiment, the ratio of propane to hydroxylated mixed tallow fatty acids is kept the same, but the temperature is kept at 175–178° F. and at a pressure of 650 p. s. i. g. In this case, only 60% of the saturated acids present passes into the overhead fraction while all of the hydroxylated material plus 40% of the saturated acids is recovered in the bottom fractions.

*Example IV*

Two hundred pounds of triple-pressed stearic acid of an iodine number of 4 is placed in a reactor equipped with cooling coils, a condenser, stirrer and a temperature recorder and 200 pounds of benzene is added. To this mixture, 0.65 pound of sodium acetate is added and well stirred.

Thirteen pounds of commercial 40% peracetic acid is then added in increments so that with cooling, the temperature is kept at 20–25° C. This requires about ½ hour. The reaction mixture is held at 25° C. for 4 hours, and then the aqueous layer is removed. The oil phase is washed twice with 10 gallons of water each time and then filtered with 5% earth to remove most of the water. The benzene is then removed under vacuum.

A sample of material prepared as above is treated to continuous propane fraction. One hundred-fifty parts of propane are mixed with 10 parts of the liquefied reaction product and kept at 200° F. and 690 p. s. i. g. The saturated acids, about 80%, passes into the overhead fraction while all of the oxygenated material is recovered in the bottoms fraction.

It will be readily recognized that the present invention may be applied to any mixture of saturated and unsaturated fatty acids with the production of a substantially pure saturated acid and a second fraction consisting of either the hydroxylated or epoxidized fatty acid related to the unsaturated fatty acids originally present. Prior to splitting, the glycerides may be hydrogenated, either partially or fully, to increase the proportion of saturated acids. Also, it is possible to obtain an intermediate oxy composition by the hydroxylation process previously outlined. This composition is a hydroxy acyloxy fatty acid such as hydroxy formoxy stearic acid or hydroxy acetoxy stearic acid and is formed during the oxidation reaction. The acyloxy group can be hydrolyzed to give the di-hydroxy as previously outlined, or the hydrolysis step may be omitted, in which case the oxidized product which is later separated is the hydroxy acyloxy fatty acid. The separation of the saturated acids and the hydroxy acyloxy fatty acids in propane is best at low temperatures in the range of 0° F. to 30° F. wherein the saturated acids are recovered as bottoms, and the oxidized acids are in the overhead at a 2–5:1 feed ratio.

Thus, for example, any of the single, double or triple-pressed grade of stearic acids may be treated by this process to prepare a substantially pure saturated fatty acid fraction and a hydroxylated or epoxidized fatty acid related to the unsaturated acids present in single, double, and triple pressed stearic acid. The process may be applied to vegetable and fish acids, that is, mixtures of fatty acids, derived from vegetable oils and fish oils, as well as those derived from animal fats.

If it is desired to further purify these saturated acids, they may be run through a decolorizer after separation from the di-hydroxy or epoxy acids. The di-hydroxy or epoxy acid fractions may be further purified by treating again with a solvent or by recrystallizing.

As a further extension of this invention, it is possible to effect the separation desired using a filter system. In the usual preparation of saturated acids utilizing a solvent method, the mixed saturated and unsaturated acids derived from say tallow are dissolved in a solvent, the solvent cooled until the "stearic acid" is crystallized out, and then the mixture filtered. The recovered saturated acids from tallow would then be designated as single, double or tripple-pressed stearic acid depending on the iodine value obtained.

Using this same system but operating at entirely different temperature and pressure conditions, di-hydroxy stearic acid may be separated from saturated acids by solvent crystallization. Using propane as the solvent, it is necessary to initially keep temperatures at about or above 80° F. to insure solution of the saturated acids. Ratios of solvent to the dihydroxy stearic-stearic mixture can vary between 1.5 to 1 to 5 to 1. After complete solution of the saturated acids, the temperature may be lowered to just before the point at which the stearic acid fraction would begin to crystallize. Lowest permissible temperatures are desirable to minimize the solubility of the di-hydroxy stearic acid. Higher solvent ratios may be employed which would permit lower temperatures.

*Example V*

One hundred grams of a mixture of polyhydroxy stearic acids and saturated acids prepared as in Example II is placed in a pressure apparatus, and 400 grams of propane is added from a pressure bottle. The mixture is heated to 120° F. and then cooled to 80° F. and filtered at this temperature. A substantially quantitative separation of the saturated acid in the filtrate and the hydroxylated stearic acids as the precipitate is obtained.

Obviously, many modifications and variations of the invention as hereinbefore set forth may be made without departing from the spirit and scope thereof and therefore only such limitations should be imposed as are indicated in the appended claims:

We claim:

1. A method for the separation of saturated fatty acids containing stearic acid having improved color and color stability from a mixture of saturated and unsaturated fatty acids which comprises: reacting said mixture of saturated and unsaturated fatty acids with an oxidizing agent selected from the group consisting of chromic acid, nitric acid, potassium permanganate, peracetic acid, perbenzoic acid, and monoperphthalic acid, and contacting said mixture with a liquefied normally gaseous hydrocarbon to selectively dissolve said saturated acids free from the oxidized acids and color bodies.

2. A method for the separation of stearic acid from a mixture of fatty acids derived from the group consisting of vegetable, animal, and fish oils, said stearic acid having improved color and color stability which comprises: reacting said mixture of fatty acids with an oxidizing agent selected from the group consisting of chromic acid, nitric acid, potassium permanganate, peracetic acid, perbenzoic acid and monoperphthalic acid, and contacting said mixture with a liquified normally gaseous hydrocarbon to form two immiscible liquid phases, the overhead phase containing dissolved saturated fatty acids and the bottoms phase containing the oxidized acids and color bodies, and removing the overhead phase containing substantially color-stable stearic acid.

3. A method for the preparation of a pure saturated fatty acid fraction, said saturated fraction containing a member from the group consisting of myristic acid, palmitic acid, stearic acid and mixtures thereof from a mixture of saturated and unsaturated fatty acids which comprises: reacting said mixture of saturated and unsaturated fatty acids with an oxidizing agent selected from the group consisting of chromic acid, nitric acid, potassium permanganate, peracetic acid, perbenzoic acid and monoperphthalic acid, introducing the oxidized mixture into a tower containing a liquefied normally gaseous hydrocarbon to form an overhead phase and bottoms phase, said overhead phase containing the saturated acid fraction, and said bottoms phase containing oxidized acids and color bodies, and evaporating the hydrocarbon solvent from said overhead phase to recover a color-stable saturated acid fraction.

4. A method for the separation of saturated fatty acids having improved color and color stability from a mixture of tallow fatty acids which comprises: reacting said mixture of fatty acids with an oxidizing agent selected from the group consisting of chromic acid, nitric acid, potassium permanganate, peracetic acid, perbenzoic acid, and monoperphthalic acid, and contacting said mixture with a liquefied normally gaseous hydrocarbon to form an overhead phase and a bottoms phase, the overhead phase containing dissolved saturated fatty acids and the bottoms phase containing the oxidized acids and color bodies, and removing the overhead phase containing substantially color-stable stearic acid.

5. A method for the preparation of a pure saturated fatty acid fraction from a mixture of tallow fatty acids which comprises: reacting said mixture with an oxidizing agent selected from the group consisting of chromic acid, nitric acid, potassium permanganate, peracetic acid, perbenzoic acid and monoperphthalic acid, introducing the oxidized mixture into a tower containing a liquefied normally gaseous hydrocarbon under temperature and pressure conditions between about 190–220° F. and 670–720 p. s. i. g. to form an overhead phase rich in saturated acids and a bottoms phase rich in oxidized acids and color bodies, removing the liquid hydrocarbon and dissolved saturated acids as overhead and the oxidized acids and color bodies as bottoms whereby a substantially color-stable saturated acid fraction is recovered.

References Cited in the file of this patent

UNITED STATES PATENTS

| | | |
|---|---|---|
| 2,443,280 | Swern et al. | June 15, 1948 |
| 2,492,201 | Swern et al. | Dec. 27, 1949 |
| 2,510,905 | Raczynski | June 6, 1950 |

OTHER REFERENCES

Jamieson: Vegetable Fats and Oils, page 296, Chemical Catalog Co., Inc., New York, N. Y., A. C. S. Monograph Series No. 58 (1932), Call No. TP 680.J3.